United States Patent [19]

Seki et al.

[11] Patent Number: 5,006,977
[45] Date of Patent: Apr. 9, 1991

[54] FIGURE ELEMENT REVISING METHOD

[75] Inventors: Masaki Seki; Takashi Takegahara, both of Tokyo; Akira Kajitani, Yamanashi, all of Japan

[73] Assignee: Fanuc Ltd., Minamitsuru, Japan

[21] Appl. No.: 381,409

[22] PCT Filed: Nov. 15, 1988

[86] PCT No.: PCT/JP88/01152
§ 371 Date: Jul. 14, 1989
§ 102(e) Date: Jul. 14, 1989

[87] PCT Pub. No.: WO89/05007
PCT Pub. Date: Jun. 1, 1989

[30] Foreign Application Priority Data

Nov. 18, 1987 [JP] Japan .................... 62-291254

[51] Int. Cl.$^5$ .......................... G05B 19/403
[52] U.S. Cl. ................. 364/192; 364/474.23; 364/474.26
[58] Field of Search ............. 364/191, 192, 474.26, 364/518, 521, 522, 474.23, 474.24, 474.22

[56] References Cited

U.S. PATENT DOCUMENTS 4,891,763  1/1990  Kuriyama .......................... 364/192
4,939,635  7/1990  Seki et al. ........................ 364/191

Primary Examiner—Jerry Smith
Assistant Examiner—P. Gordon
Attorney, Agent, or Firm—Staas & Halsey

[57] ABSTRACT

In revising a figure element, the figure element ($C_2$) to be revised is designated, the designated figure element ($C_2$) is displayed by a type of line or and color different from those of other figure elements, the figure elements ($S_1$, $C_1$) used in defining the designated figure element ($C_2$) are displayed by a line of a different type and color, a message (M) which includes definition statements of the figure elements ($S_1$, $C_1$), as well as a radius necessary for defining the figure element ($C_2$), is displayed on a display screen, and revision of the figure element is executed by referring to the display.

12 Claims, 6 Drawing Sheets

FIG. 2

FIGURE ELEMENT REVISING METHOD

BACKGROUND OF THE INVENTION

1. Field of the Invention

This invention relates to a figure element revising method and, more particularly, to a figure element revising method for displaying and revising a group of figure elements including figure elements defined using figure elements that have already been defined.

2. Description of the Prior Art

In an automatic programming system for creating NC data using an automatic programming language such as APT or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted into NC data comprising NC data (EIA codes or ISO codes) in a format capable of being executed by an NC unit.

FIG. 6 is a view for describing figure definition statements. Figure definition of circles $C_1$, $C_2$, $C_3$, $C_4$ and straight lines $S_1$, $S_2$ is performed as follows using a keyboard or tablet:

$$C_1 = x_1, y_1, r_1 \quad (1)$$

$$S_1 = P(x_2, y_{n2}), P(x_3, y_3) \quad (2)$$

$$C_2 = S_1, C_1, r_4, B, I, R \quad (3)$$

$$C_3 = x_5, y_5, r_5 \quad (4)$$

$$C_4 = S_1, C_1, C_2, B, I, O, L \quad (5)$$

$$S_2 = C_2, C_3, A, A \quad (6)$$

In the foregoing, equation (1) signifies a circle $C_1$ of center $(x_1, y_1)$ and radius $r_1$;

equation (2) signifies a straight line $S_1$ passing through two points $(x_2, y_2)$, $(x_3, y_3)$;

equation (3) signifies a circle $C_2$ of radius $r_4$ tangent to the straight line $S_1$ from below, internally tangent to the circle $C_1$ and located on the right side;

equation (4) signifies a circle $C_3$ of center $(x_5, y_5)$ and radius $r_5$;

equation (5) signifies a circle $C_4$ tangent to the straight line $S_1$ from below, internally tangent to the circle $C_1$, externally tangent to the circle $C_2$ and located on the left side; and equation (6) signifies a straight line (tangent) $S_2$ tangent to the circle $C_2$ from above and to the circle $C_3$ from above. The alphabetic character A represents a qualifier meaning "above", B a qualifier meaning "below", R a qualifier meaning "right", L a qualifier meaning "L", I a qualifier meaning "internally tangent", and O a qualifier meaning "externally tangent".

As described in the example of the figure definition statement of the prior-art set forth above, there are two methods of figure definition. A first definition method entails defining points, straight lines and circles using absolute numeric data. A point is defined as $$P = x, y$$

using the coordinates $(x,y)$ of the point [see FIG. 7(a)]; a straight line is defined as $$S = P(x_1, y_1), P(x_2, y_2)$$

using the two points $(x_1, y_1)$, $(x_2, y_2)$ through which the straight line passes [see FIG. 7(b)]; and a circle is defined as $$C = x, y, r$$

using the coordinates $(x,y)$ of the center of the circle and the radius r of the circle [see FIG. 7(c)]. A figure definition statement based on the first definition method shall be referred to as a first definition statement hereinafter.

The second definition method entails defining straight lines and circles using other points, straight lines and circles that have already been defined. For example, point $P_1$ [see FIG. 7(d)] is defined as follows:

$$P_1 = S, C, L$$

The straight lines $S_1$ [see FIG. 7(e)] is defined as follows, by way of example:

$$S_1 = C_1, C_2, A, A$$

(A is a qualifier meaning "above"); and the circle C [see FIG. 7(f)] is as follows, by way of example:

$$C = S_1, S_2, S_3, R, A, L$$

A figure definition statement based on the second definition method shall be referred to as a second definition statement, hereinafter various types of second definition statements are available, that is, they are not limited to the foregoing examples.

When figure definition is performed, the arrangement is such that a figure element is defined by the first definition statement, and another figure element is defined by the second definition statement using the figure element in accordance with the first definition statement.

There are cases where it is desired to modify a figure element (FIG. 6), such as the circle $C_2$, defined using an already defined figure element. In such case, the definition statement of circle $C_2$ is $$C_2 = S_1, C_1, r_4, B, I, R$$

Since definition is performed utilizing the figure elements $S_1$, $C_1$ based on the first definition statement, the figure elements $S_1$, $C_1$ and the radius $r_4$ must be revised in order to make the modification. However, the figure definition statement of each figure element is not displayed on the display screen, and there is no correspondence between the symbols ($P_i$, $S_i$, $C_i$) of the figures used by the figure definition statements and the figure elements painted on the display screen. Consequently, searching for figure elements and data utilized in the definition of the figure element desired to be modified is a troublesome operation, and making the revision is very difficult.

Accordingly, an object of the present invention is to provide a figure element revising method through which figure elements and data necessary for making a revision can be distinguished merely by designating the figure element desired to be modified, as a result of which revision of the figure element can be performed quickly and easily.

SUMMARY OF THE INVENTION

When a figure element to be revised is designated in figure element revision, the color and/or the type of line of the designated figure element are changed to display the element in a first mode, the color and/or the type of line of an already defined figure element used in the definition of the designated figure element is changed to display the figure element in a second mode, the figure definition statements and other data used in definition the figure element to be revised are displayed on a display screen, and figure element revision is executed by referring to the display.

BRIEF DESCRIPTION OF THE DRAWINGS

FIG. 2 is a view for describing the principal portion of a menu chart;

DESCRIPTION OF THE PREFERRED EMBODIMENT

Figure 1:
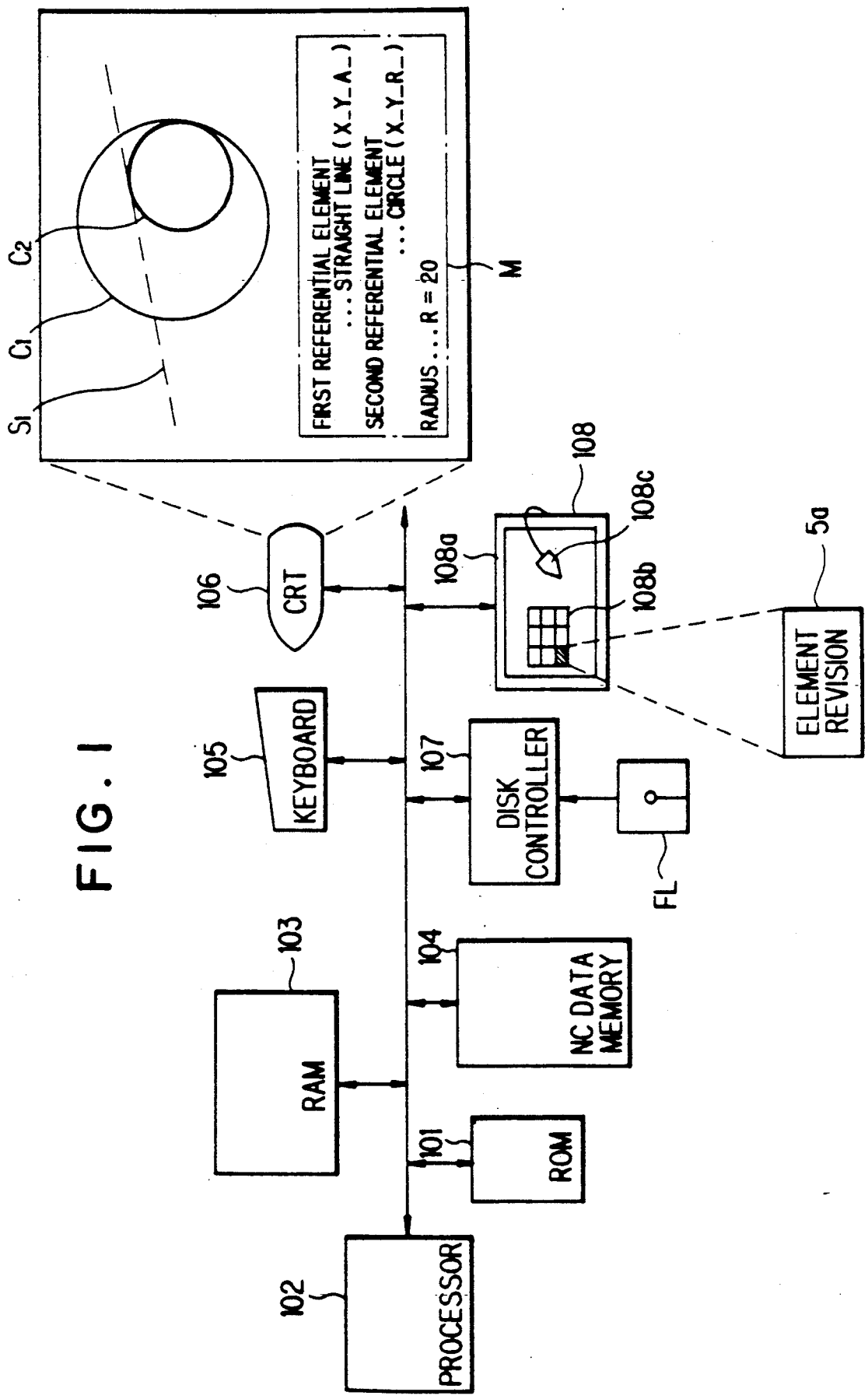
Fig 1 is a block diagram of an apparatus for practicing the present invention.

FIG. 1 is a block diagram of an automatic programming apparatus for practicing the present invention.

Numeral 101 denotes a ROM storing a loading program and the like, 102 a processor for executing automatic programming processing, and 103 a RAM for storing a system program read in from a floppy FL, as well as various parameters and results of processing. Numeral 104 denotes an NC data memory for storing the finally created NC data having an executable format, 105 a keyboard, 106 a display unit (CRT), 107 a disc controller, and 108 a tablet device having a tablet surface 108a to which a menu chart 108b having menu items is affixed. Prescribed menu items are picked by a tablet cursor 108c. A graphic cursor on a display screen is moved by moving the cursor 108a on the tablet surface. FL represents a floppy disc.

Figure 2:
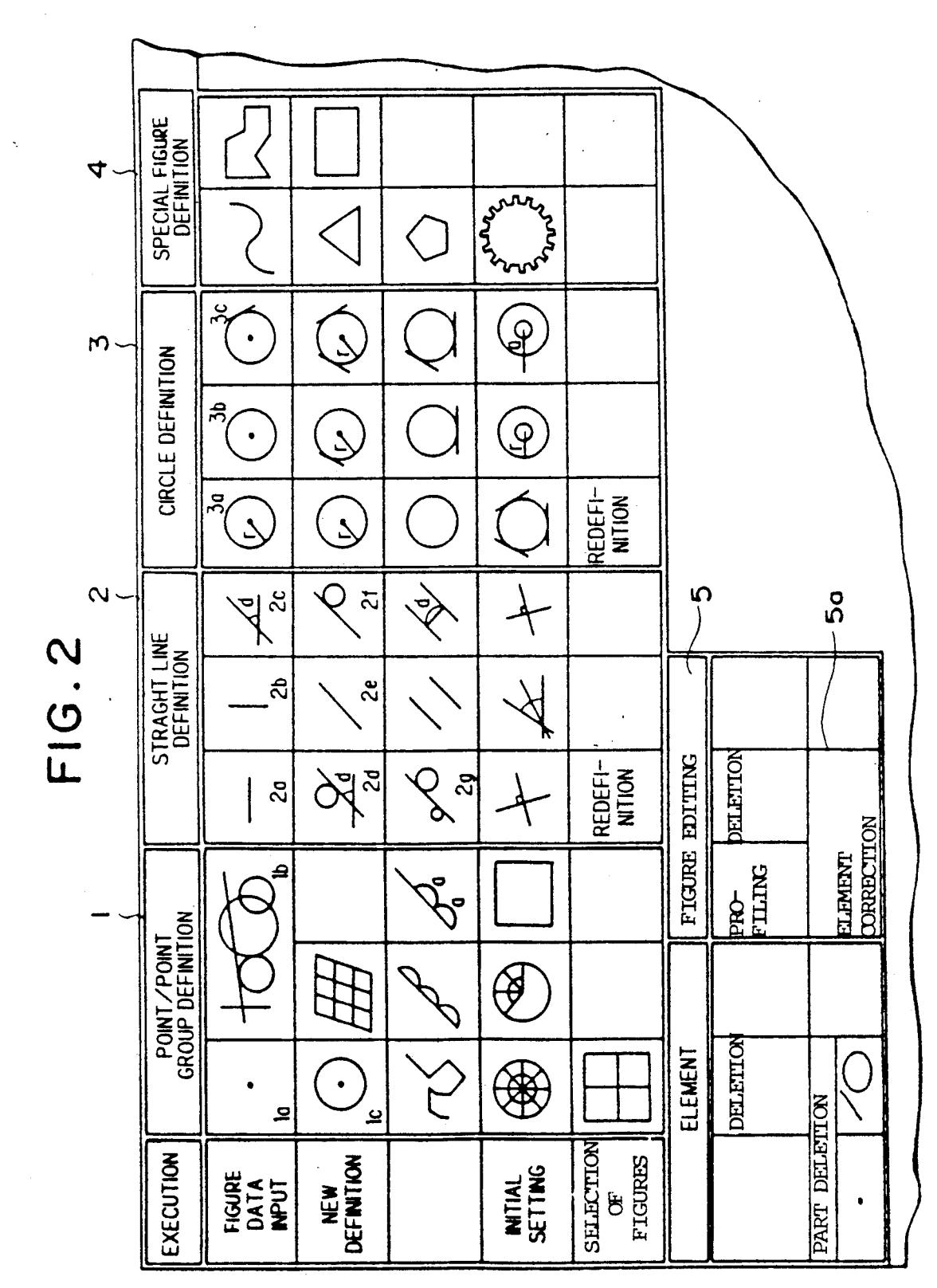

FIG. 2 is a view for describing the principal parts of the menu chart 108b. Numeral 1 denotes a "POINT/POINT GROUP DEFINITION" section, 2 a "STRAIGHT LINE DEFINITION" section, 3 a "CIRCLE DEFINITION" section, 4 a "SPECIAL FIGURE DEFINITION" section and 5 a "FIGURE EDITING" section. The "FIGURE EDITING" section 5 includes an "ELEMENT CORRECTION" item 5a.

Figure 3:
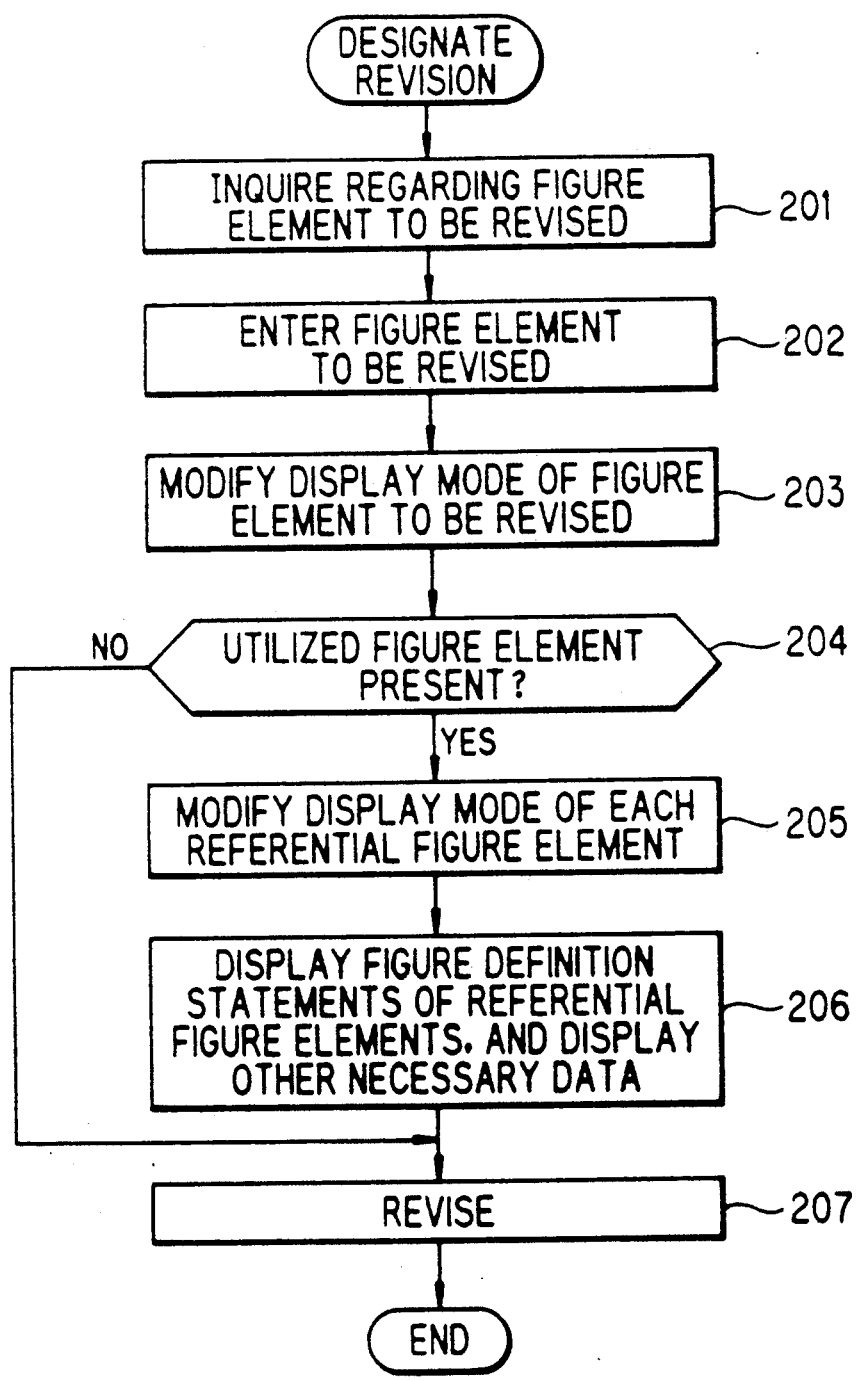
FIG. 3 is a flowchart of figure revision processing according to the invention.

FIG. 3 is a flowchart of figure element revision processing according to the invention. The figure element revising method of the invention will now be described in accordance with this flowchart. The system program for creating the NC part program, parameters and the like have already been stored in the RAM 103 from the floppy disc FL.

Figure 4:
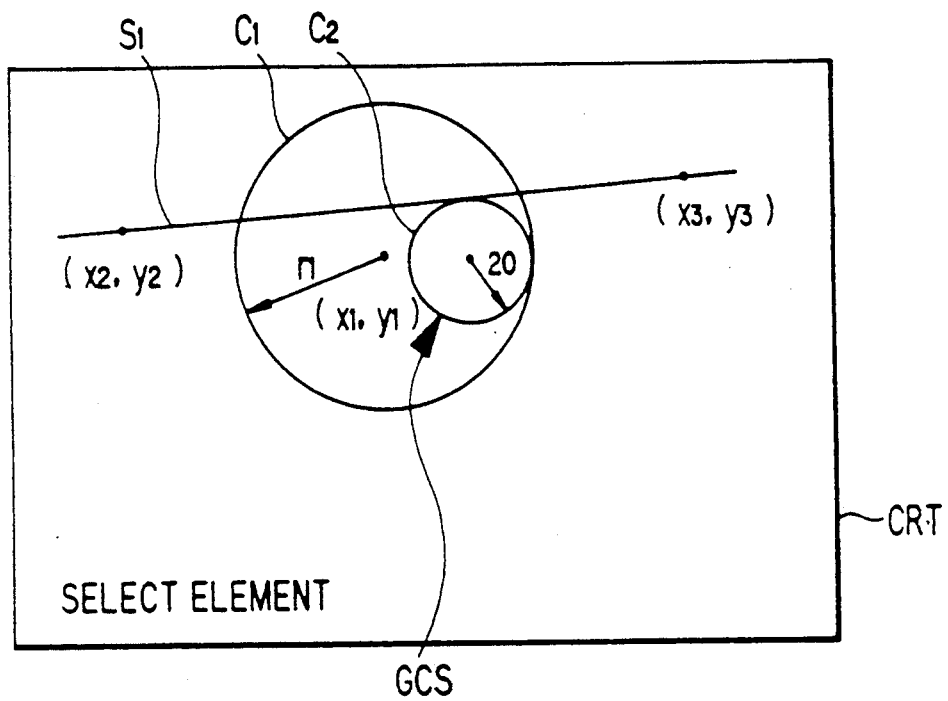
FIGS. 4 and 5 for displays illustrating examples of conversational displays in figure revision processing according to the present invention.

The circles $C_1$, $C_2$ and straight line $S_1$ shown in FIG. 4 are defined by performing a direct coordinate input, or by citing figure elements displayed on the CRT 106, using the tablet 108 and keyboard 105. As for the figure definition statements, it is assumed that figure definition is performed as follows:

$C_1 = x_1, y_1, r_1$ $S_1 = P(x_2, y_2), P(x_3, y_3)$ $C_2 = S_1, C_1, 20, B, I, R$

The defined figure elements are stored in the RAM 103 and displayed in the form of, for example, yellow lines on the CRT 106.

Under these conditions, assume that the circle $C_2$ among the group of figure elements displayed on the CRT 106 is to be modified. In such case, the "ELEMENT CORRECTION" (i.e., element revision) item 5a is picked from the table menu chart 108b. In response to selection of "ELEMENT CORRECTION" the processor displays the prompt "SELECT ELEMENT" on the CRT 106 and causes the graphic cursor GCS to be displayed on the CRT (step 201).

Figure 5:
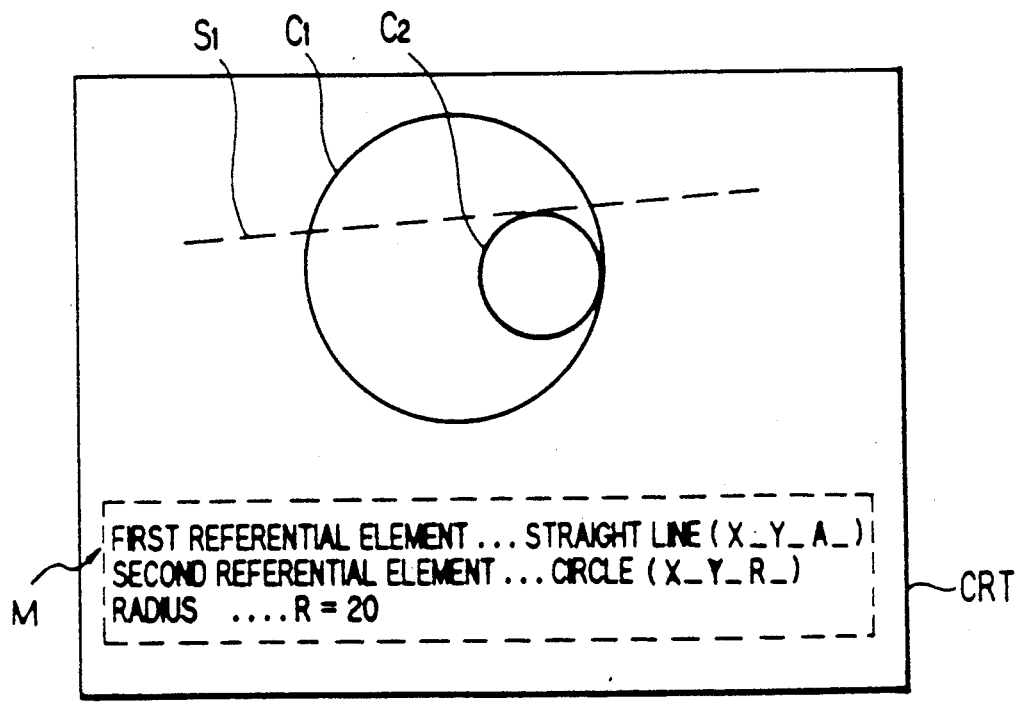
Figure 6:
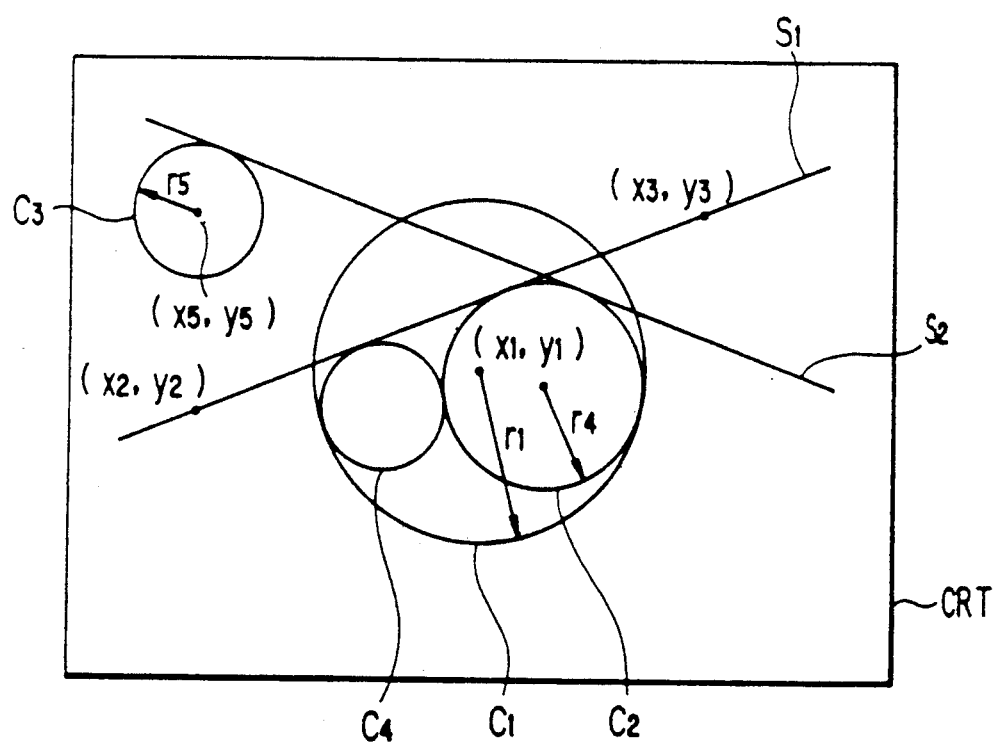
FIGS. 6 and 7(a)-(f) are views for describing an example of the prior art.
Figure 7A:
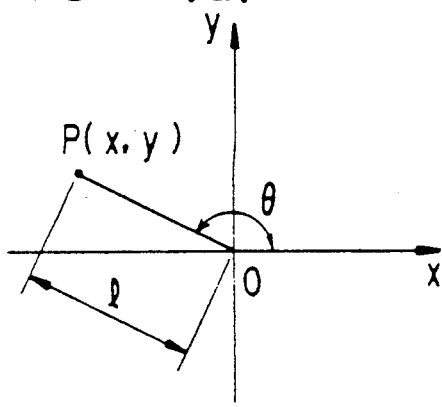
Figure 7D:
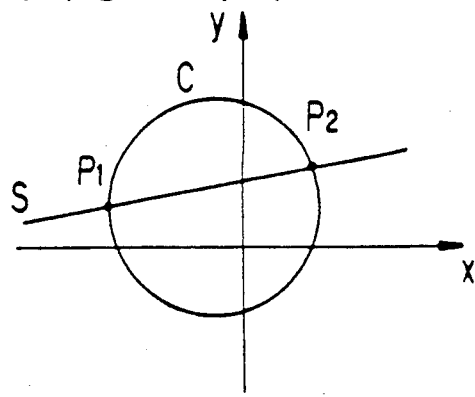
Figure 7B:
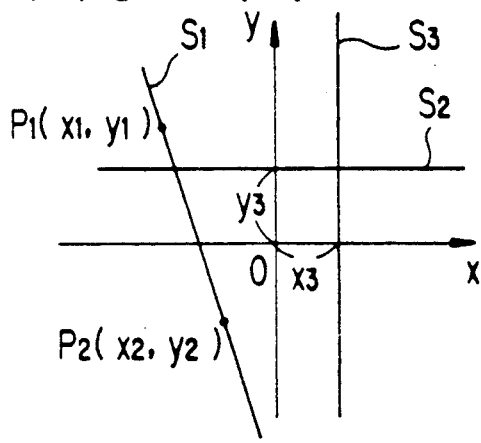
Figure 7E:
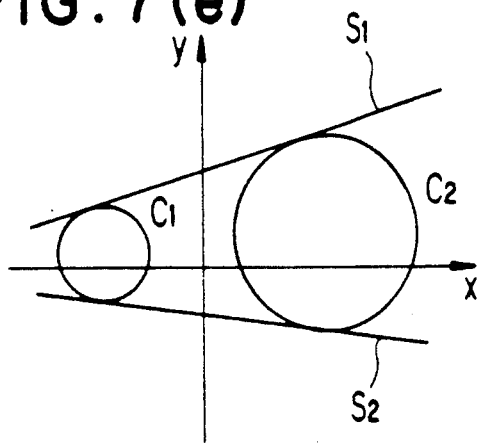
Figure 7C:
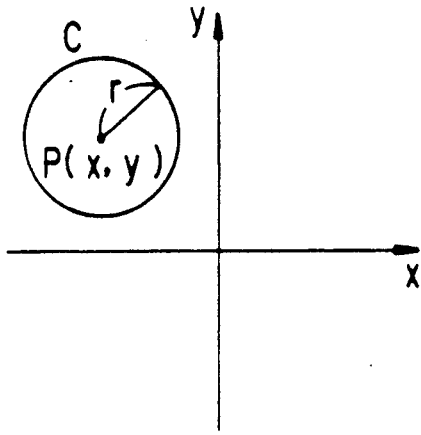
Figure 7F:
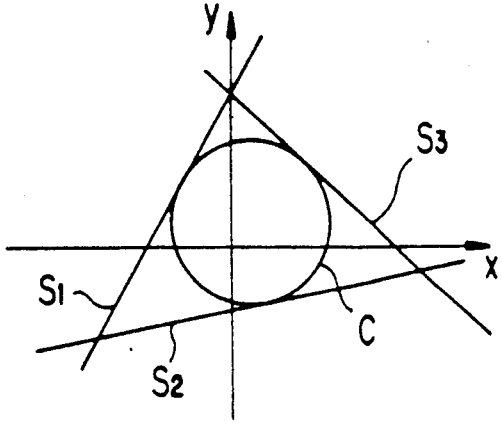

When graphic cursor GCS is positioned on the circle $C_2$, which is the element to be revised, in order to pick the same (step 202), the processor 102 causes the selected element, namely circle $C_2$, to be displayed in the form of a line type and color [e.g., a white, bold, solid line (FIG. 5)] different from those of the other figure elements (step 203) and then determines whether there is a figure element utilized in the definition of circle $C_2$ (step 204). If a utilized figure element (referred to as a "referential element") exists, the first referential element (straight line $S_1$ in the example) is displayed in the form of a different line type and color (e.g., a broken red line), and the second referential element (circle $C_1$ is the example), which is used in the definition of circle $C_2$, is displayed in the form of a different line and color (e.g., a solid red line (step 205). It should be noted that elements can be displayed upon changing only their color or line type to distinguish them.

A message M which includes the data necessary for element revision, namely the definition statements of the first referential element (straight line $S_1$) and second referential element (circle $C_1$) as well as such data as the radius used in the definition of the circle $C_2$, is displayed on the CRT 106 (step 206).

Thereafter, the operator makes the revision (step 207) upon referring to the figures and the message M displayed on the CRT 106. For example, if the radius of circle $C_2$ is to be revised from 20 to 25, the "20" of "R=20" (FIG. 5) is replaced by "35" by a prescribed operation at keyboard 105, and then the execute key is pressed. When this is done, the figure of the circle $C_2$ changes from a circle of radius 20 to a circle of radius 35, the color of the entire figure returns to yellow and the figure definition statement also changes to $C_2 = S_1, C_1, 35, B, I, R$ In accordance with the present invention, a predetermined figure element is designated, the color and/or the type of line of the designated figure element are changed to display the element in a first mode, the color and/or the type of line of a referential element used in the definition of the designated figure element is changed to display the figure element in a second mode, and the referential element definition statement and data, such as a radius needed to define the designated figure element, are displayed on a display screen to perform the revision. As a result, revision of the figure element can be performed quickly and easily and, hence, the NC data obtained using the defined figure element can also be created quickly and easily.

We claim:

1. A figure element revising method for revising a figure element defined by a figure element definition statement in an automatic programming language, said method comprising the steps of:
   (a) displaying a group of previously defined figure elements;
   (b) designating a figure element as a figure element to be revised, and changing at least one of color and line type of the figure element to be revised to display the figure element to be revised in a first mode;
   (c) changing at least one of color and line type of a referential figure element used in defining the figure element to be revised to display the referential figure element in a second mode;
   (d) displaying the figure definition statement of the referential figure element on a display screen; and
   (e) revising the figure element to be revised upon referring to the display.

2. A figure element revising method as recited in claim 1, wherein said displaying in step (d) includes displaying data used in the figure definition statement of the figure element to be revised, in addition to the figure definition statement of the figure element to be revised.

3. A method for revising a figure element having a figure definition statement based on previously defined figure elements, said method comprising the steps of:
   (a) selecting a figure element to be revised form a plurality of previously defined figure elements;
   (b) distinguishably displaying the figure element selected in step (a) from the figure elements remaining in the plurality of previously defined figure elements;
   (c) determining if the figure element selected in step (a) has a figure definition statement based on at least one of the previously defined figure elements;
   (d) identifying, in dependence upon said determining in step (c), the at least one of the previously defined figure elements upon which the figure element selected in step (a) is based;
   (e) distinguishably displaying the at least one of the previously defined figure elements identified in step (d); and
   (f) revising the figure element selected in step (a) upon referring to information displayed in step (b) and (e) by revising the figure definition statement thereof.

4. A method as recited in claim 3, wherein said displaying step (e) includes the step of displaying the figure definition statements corresponding to the at least one of the previously defined figure elements identified in step (d).

5. A method as recited in claim 4, wherein said distinguishably displaying in steps (b) and (e) distinguishes the figure element by altering one of color and line type.

6. A method as recited in claim 4, wherein said method further comprises the steps:
   (g) repeating steps (a)–(f) until all the figure elements needing revision have been revised; and
   (h) producing numerical control data from the figure definition statements of the figure elements.

7. A method as recited in claim 4, wherein the method is used in an automatic programming system includes a display screen, and
   wherein said displaying in steps (b) and (e) occurs on the display screen.

8. A method as recited in claim 7, wherein the automatic programming system includes a table device having a menu chart and cursor, and a graphic cursor is displayed on the display screen, and
   wherein said selecting in step (a) is performed by positioning the graphic cursor on the figure element to be selected by moving the cursor on the tablet device.

9. A system for revising a figure element having a figure definition statement based on previously defined figure elements, comprising:
   display means for displaying figure elements and figure definition statements;
   input means for selecting a figure element to be revised from a plurality of previously defined figure elements; and
   control means for controlling revision of the figure element selected by said input means, said control means including
   first means for distinguishably displaying on said display means the figure element selected by said input means from the figure elements remaining in the plurality of previously defined figure elements;
   second means for determining if the figure element selected by said input means has a figure definition statement based on at least one of the previously defined figure elements, and for identifying the at least one of the previously defined figure elements upon which the figure element is selected is based; and
   third means for distinguishably displaying on said display means the at least one of the previously defined figure elements identified by said second means.

10. A system as recited in claim 9, wherein the distinguishably displaying by said first and third means distinguishes the figure element by altering one of color and line type.

11. A system as recited in claim 9, wherein said system is an automatic programming system, and
    wherein said input means comprises a table device having a menu chart and cursor.

12. A system as recited in claim 11, wherein said display means includes a graphic cursor, and
    wherein said selecting by said input means is performed by positioning the graphic cursor on the figure element to be selected by moving the cursor on the tablet device.

* * * * *

UNITED STATES PATENT AND TRADEMARK OFFICE
CERTIFICATE OF CORRECTION

PATENT NO. : 5,006,977
DATED : April 9, 1991
INVENTOR(S) : Masaki Seki, Takashi Takegahara, Akira Kajitani It is certified that error appears in the above-identified patent and that said Letters Patent is hereby corrected as shown below:

Col. 1, line 11, "Prior" should be --Related--;

Col. 2, line 38, "hereinafter various": should be --hereinafter. Various".

Col. 3, line 26, "for" should be -- are--;
line 30, "art," should be --art--.

Col. 5, line 37, "form" should be --from--.

In the Abstract line 3, delete "and".

Signed and Sealed this

Third Day of December, 1991

Attest:

HARRY F. MANBECK, JR.

Attesting Officer     Commissioner of Patents and Trademarks